May 20, 1941.  R. H. ULRICH  2,242,732
APPARATUS FOR MAKING DIPPED GOODS
Filed April 20, 1939  4 Sheets-Sheet 1

INVENTOR
RUDOLF H. ULRICH
BY J. Ralph Barrow
ATTORNEY

May 20, 1941.  R. H. ULRICH  2,242,732
APPARATUS FOR MAKING DIPPED GOODS
Filed April 20, 1939  4 Sheets-Sheet 2
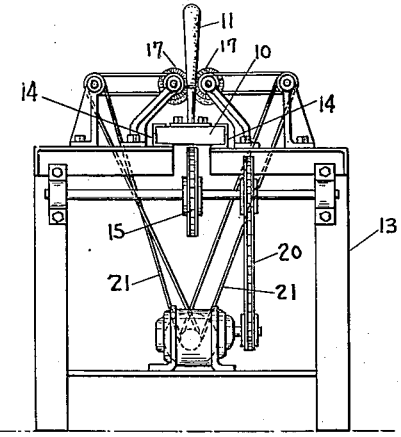
FIG. 3
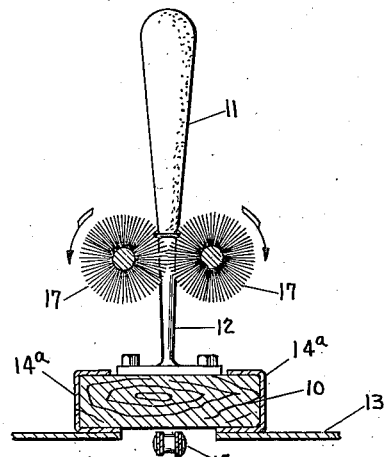
FIG. 4
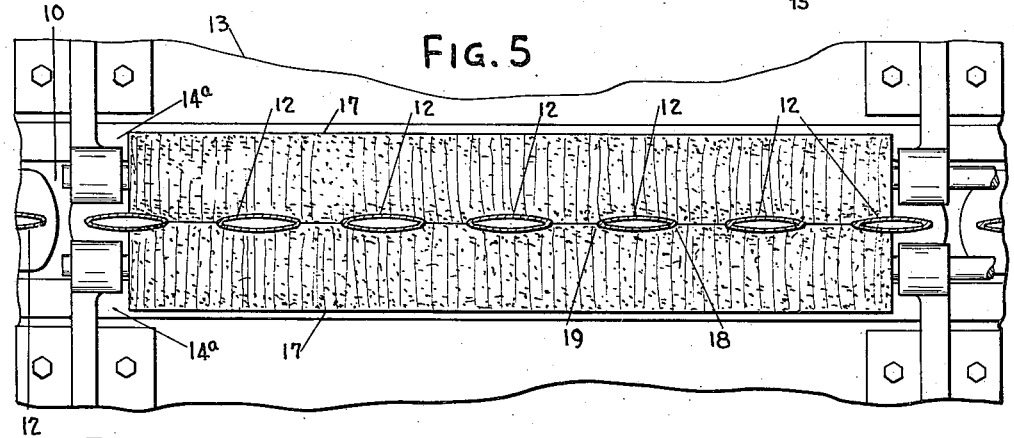
FIG. 5
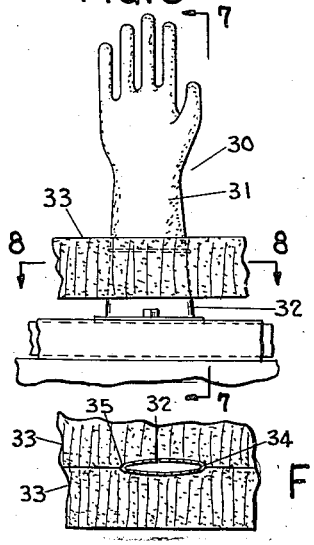
FIG. 6
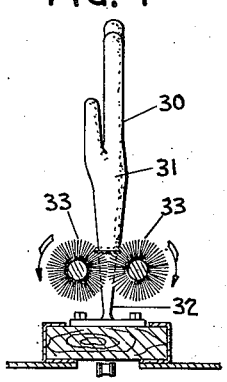
FIG. 7
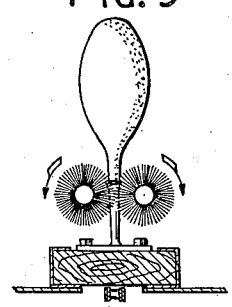
FIG. 9
FIG. 8
INVENTOR
RUDOLF H. ULRICH
BY
*J. Ralph Darrow*
ATTORNEY

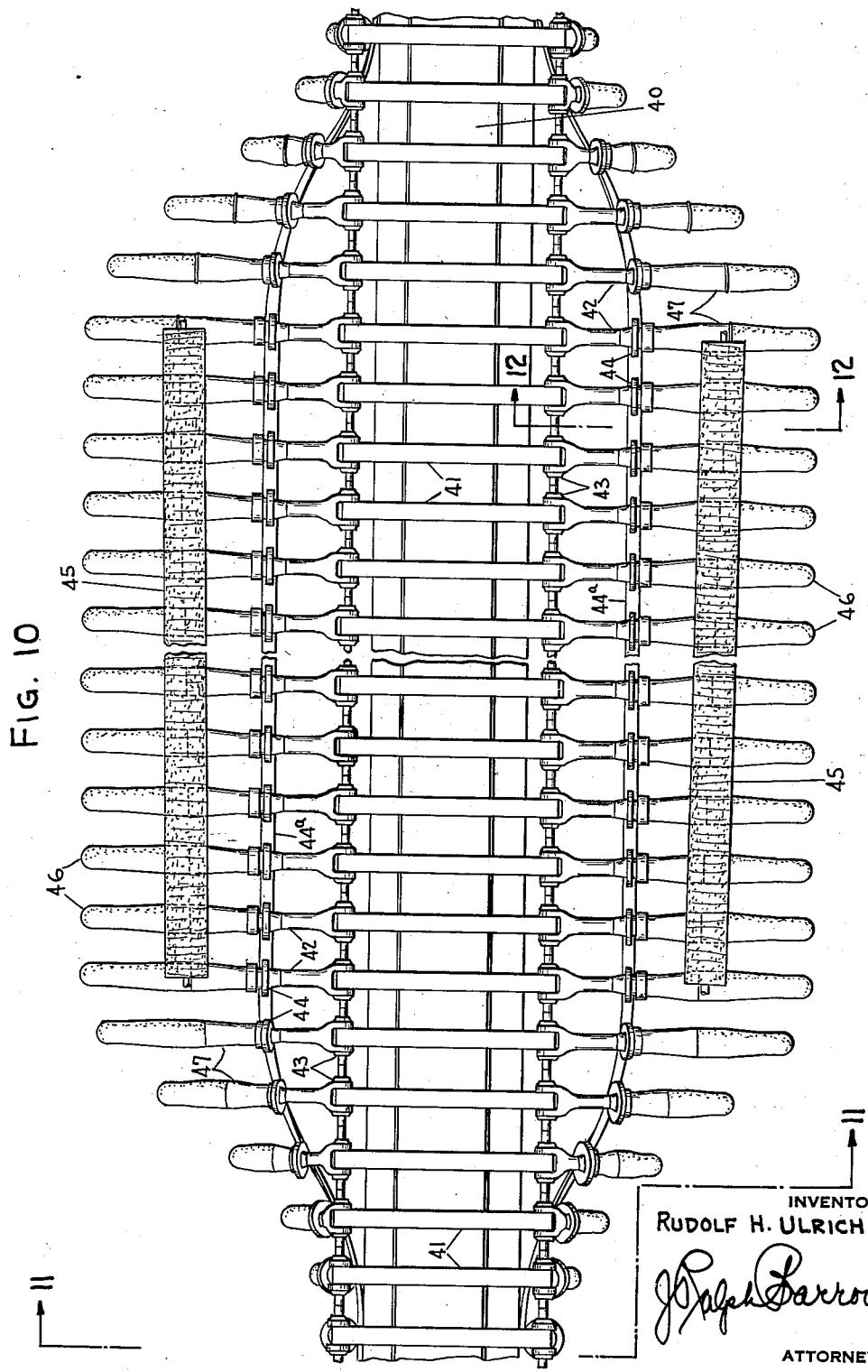

May 20, 1941.   R. H. ULRICH   2,242,732
APPARATUS FOR MAKING DIPPED GOODS
Filed April 20, 1939   4 Sheets-Sheet 4

INVENTOR
RUDOLF H. ULRICH
BY
*Ralph Barrow*
ATTORNEY

Patented May 20, 1941

2,242,732

UNITED STATES PATENT OFFICE 2,242,732

APPARATUS FOR MAKING DIPPED GOODS

Rudolf H. Ulrich, Akron, Ohio

Application April 20, 1939, Serial No. 268,918

2 Claims. (Cl. 18—2)

This invention relates to apparatus for making dipped rubber articles and more particularly, to apparatus for rolling rings or beads at the mouths of such articles, including prophylactic rubber articles, finger cots, gloves, balloons, nipples, etc.

Heretofore, the types of forms provided for marking articles of the kinds enumerated, and which are normally of large diameter, have required that the forms be rotated during the bead-rolling operation, while in engagement with an inclined rotary brush arranged along side of the path of the forms.

The present inventor has found that, by reshaping the forms for these various articles, they may be fixedly mounted and passed in association with rotary bead-rolling brushes set at an angle in bead-rolling apparatus, and that beads may be effectively rolled on such forms to produce entirely satisfactory articles without the expense of providing rotatable mountings for the forms and providing rotating means in association with the bead-rolling brushes for engaging and rotating the forms as they pass through the equipment.

It is an object, therefore, of this invention, to provide apparatus for making dipped rubber goods, including forms which, at those portions which are contacted by the inclined rubber brushes, are quite thin and flat, these thin and flat portions merging smoothly and gradually into the standard or usual shape of the form whether circular, oval or otherwise, as required for the desired shape of the article to be produced. In such bead-rolling equipment, the inclined rotary brushes are provided in pairs with flexible bristles and normally rotating in opposite directions substantially tangentially with each other, the bristles having sufficient flexibility whereby the forms may be passed between such brushes with the flattened areas or portions of the forms engaged by the brushes and the bristles being thereby deflected to one side by the passing forms. The brushes shape themselves to the flattened portions of the forms and engage over the leading and following edges of the forms, serving to roll uniform beads or rings of rubber at the mouths of the articles of rubber deposited on the forms.

The foregoing and other purposes or objects of the invention are attained in the devices illustrated in the accompanying drawings and described below. It will be understood that the invention is not limited to the particular embodiments shown and described.

Of the accompanying drawings:

Figure 3 is an end elevation thereof.

Figure 4 is an enlarged section on line 4—4 of Figure 1.

Figure 5 is a plan view along line 5—5 of Figure 1.

Figure 6 is a fragmentary view of equipment of the type disclosed and showing a glove form in such equipment.

Figure 7 is a section along line 7—7 of Figure 6.

Figure 8 is a sectional view along line 8—8 of Figure 6.

Figure 9 illustrates equipment similar to that shown in Figures 1 to 5 as designed for toy balloon manufacture.

Figure 10 is a plan view of a continuous dipping machine in which the invention has been embodied.

Figure 1:
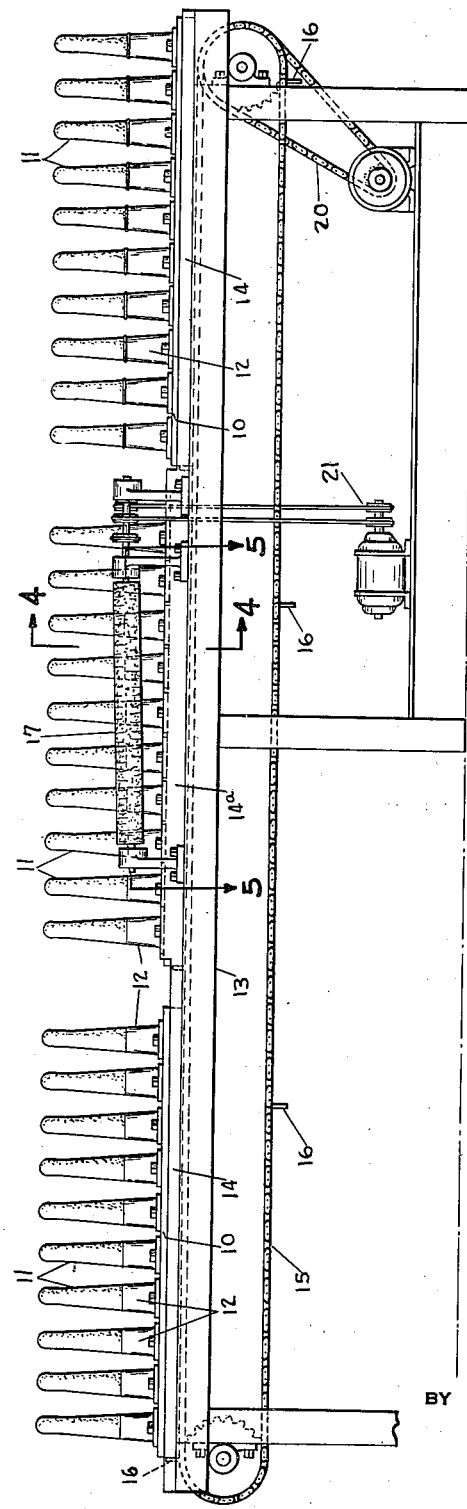
Figure 1 is a side elevation of bead-rolling equipment embodying the invention as adapted to be carried out in plants where dipping racks are employed for forming deposited rubber articles.
Figure 2:
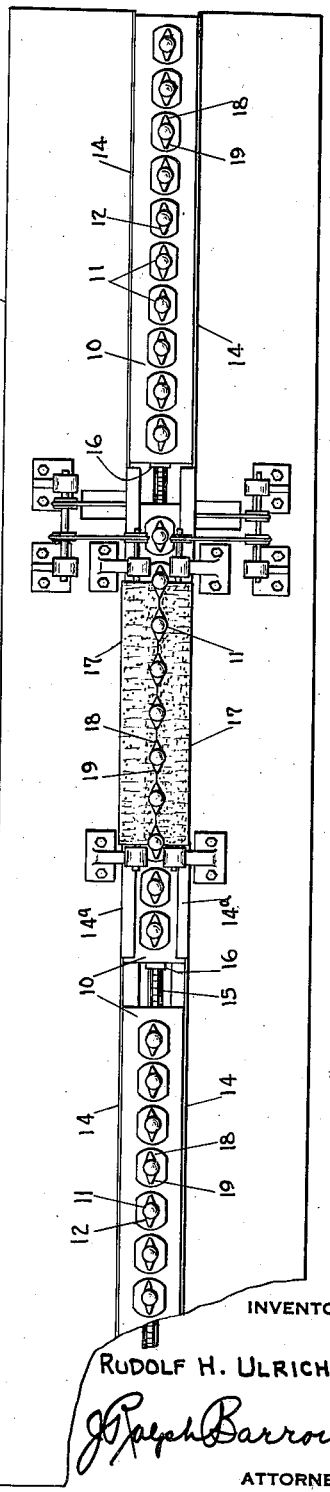
Figure 2 is a plan view thereof.

Referring to Figures 1 to 5 inclusive, the numerals 10, 10 designate form racks which may be used in suitable dipping machines, (not shown), to deposit one or more layers of rubber, indicated at 11, 11, on the forms which are secured in relatively fixed positions on said rack in any suitable way. The forms 11 are forms such as may be used for making the prophylactic rubber articles, or finger cots, and the upper portions of these forms may be of the normally round, cylindrical shape, and will of course, be of the required diameters depending upon the goods being made. As shown at 12, 12, however, the lower portions of the forms are flattened lengthwise of the rack 10, the flat portions 12 merging with the round portions 11 in a smooth and gradual manner. The perimeter of the flattened portions being at all times substantially equal with the periphery of the round portions of the forms to provide finished goods of the required diameter without any unevenness or mold marks, and to provide goods which will tend to assume normal required shapes, notwithstanding that they are formed on forms which have to some extent been flattened from the true shape of the desired articles.

Using such forms, the bead-rolling equipment may comprise a table 13 on which are suitable guides 14 between which the racks 10 may be placed at one end of the table, a conveyor 15 being provided with lugs 16 for feeding the rack along the table from one end to the other. Arranged along the table at the sides of the form paths are inclined rotary brushes 17, 17, between which the flattened portions 12 of the forms will pass in engagement with the brushes. The leading edges 18 and the following edges 19 of the forms being somewhat rounded are engaged by the bristles of the brushes 17, which are deflected or distorted out of the path of the forms by the flattened portions 12 of the forms, but nevertheless shape about the forms and wipe over the surfaces of the forms, not only along the sides thereof, but also along the rounded ends thereof, and thus engage lower edges of rubber on the forms and roll the rubber upwardly upon itself to form the bead, as illustrated in Figure 4, the brushes rotating upwardly in engagement with the forms, as indicated by the arrows in Figure 4. Figure 5 illustrates how the brushes conform to the flattened surfaces of the forms so that the brushes engage all surfaces of the forms to roll uniform rings or beads upwardly on the articles as the forms pass between the brushes.

The conveyor 16 may be driven by a suitable means indicated at 20, and the brushes 17 may be driven by a suitable means indicated at 21, as will be understood by a skilled artisan. Guides 14a, 14a, arranged below the brushes, embrace the racks 10 to prevent them from moving upwardly by friction of the brushes on the forms.

In Figures 6, 7 and 8, there is shown a form for rubber gloves, to which the equipment of the present invention is adapted. The form indicated generally by the numeral 30 has rubber deposited thereon as at 31, and the lower portion of the form is flattened as is indicated at 32, so that the portion of it which passes between the brushes 33, 33 may effectively cause the brushes to shape themselves around and conform to the surfaces of the forms, the leading and following edges 34 and 35, respectively, being rounded as described with reference to the edges 18 and 19 of the forms shown in Figures 1 to 5.

Figure 9 is a view similar to that shown in Figure 4, and showing the invention as adapted to balloon forms. It will be noted that in all the applications of the invention as shown, the flattened portions of the forms are of substantially the same perimeter as the periphery of the form would be at these points were the usual or standard forms of the prior art being employed. These flattened portions merge smoothly and gradually with the upper portions of the forms which gradually assume the normal shapes of such forms as heretofore employed, and provide articles which all tend substantially to assume the shapes required of them for service.

Figure 11:
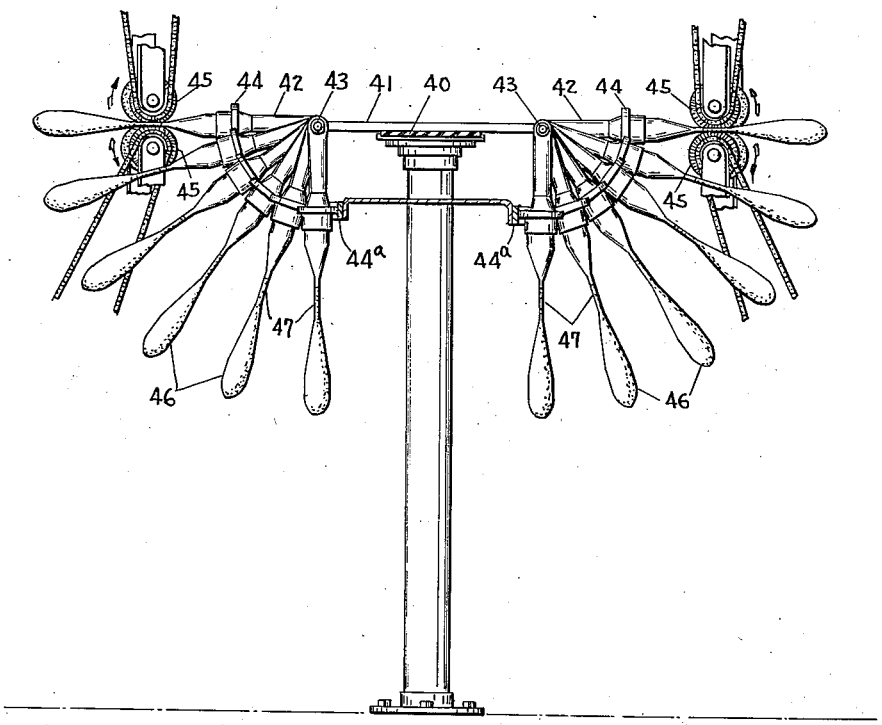
Figure 11 is a section along line 11—11 of Figure 10.
Figure 12:
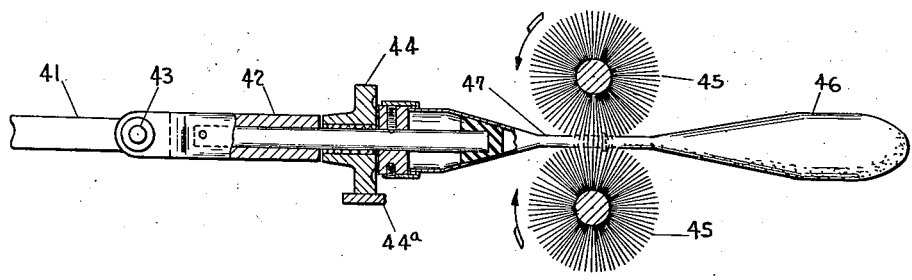
Figure 12 is a section along line 12—12 of Figure 10.

Referring to Figures 10 to 12, inclusive, the invention is shown as adapted for use in a continuous dipping machine in which the rubber is deposited on the forms in dipping tanks (not shown) arranged along the path of the conveyor, and in which the forms having the rubber deposited thereon are continuously passed from the dipping tanks through the usual drying equipment (not shown) and finally to the bead-rolling equipment, from which they pass to the vulcanizing equipment (not shown).

In such equipment there may be a conveyor 40 on which are cross-bars 41, 41 extending from one side to the other of the conveyor, and having form mounts 42, 42, hinged on the cross-bars as at 43, 43. These mounts may have thereon idler rollers 44, 44 whereby the forms may be swung up from vertical depending positions to horizontal positions, as shown in the drawings, in which latter positions they pass through and between inclined angularly arranged bead-rolling brushes 45, 45, the rollers 44 engaging on tracks 44a, 44a, which support the forms in the required horizontal position.

The forms are shown at 46, and are flattened lengthwise of the machine, as indicated at 47, the perimeter of the flattened portion 47 at any point along the form, substantially equalling the periphery of the usual or standard form, as noticed in connection with the equipment shown in Figures 1 to 5. The brushes 45, 45, are arranged above and below the forms so as to rotate in the direction of the rollers (see Figures 11 and 12), the brushes rotating substantially in tangential relation with each other at the bight thereof, whereby the forms, in passing between the brushes, distort the bristles of the brushes and the brushes shape themselves about and conform themselves to the flattened surfaces of the forms, and to the leading and following edges of the forms which are rounded in the manner disclosed with reference to the forms shown in Figures 1 to 9. Brushes 45 are inclined to the paths of the forms to progressively roll the rubber upwardly of the forms.

It will be apparent from the foregoing that a simple, effective way has been provided for forming beads on articles of comparatively large diameter, and dispensing with the use of rotary form mounts and form rotating means in the equipment.

Modifications of the invention may be resorted to without departing from the spirit thereof or the scope of the appended claims.

What is claimed is:

1. Apparatus for rolling beads or rings on the mouths of dipped rubber articles, comprising a pair of inclined rotary brushes, rotating in substantially tangential relation with each other, and in opposite directions, one or more forms on which rubber may be deposited by dipping, said forms being flattened at their lower end portions whereby they may be passed edgewise between said brushes to cause said brushes to shape themselves about and conform to the shape of the flattened portions of the end portions of the forms, and means for passing said forms edgewise between said brushes.

2. Apparatus for making dipped rubber articles, comprising one or more forms, the lower portions of which have been flattened and provided with rounded edges, and a pair of rotary brushes rotating in the opposite directions in substantially tangential relation with each other between which the lower end portions of said forms may pass and cause said brushes to shape themselves about said flattened end portions of the form, the edges of the flattened portions of said forms being slightly rounded and said brushes being inclined so as progressively to roll the rubber upwardly on forms passed between said brushes, and means for passing said forms between said brushes.

RUDOLF H. ULRICH.